United States Patent
Kato et al.

(10) Patent No.: US 8,184,397 B2
(45) Date of Patent: May 22, 2012

(54) HARD-DISK DRIVE WITH VAPOR-PHASE LUBRICANT SUPPLY SYSTEM

(75) Inventors: Yukio Kato, Kanagawa (JP); Junguo Xu, Ibaraki (JP); Nobuo Nakagawa, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 0 days.

(21) Appl. No.: 12/634,624

(22) Filed: Dec. 9, 2009

(65) Prior Publication Data

US 2011/0122531 A1 May 26, 2011

(30) Foreign Application Priority Data

Dec. 9, 2008 (JP) ................................. 2008-313592

(51) Int. Cl.
*G11B 33/14* (2006.01)
(52) U.S. Cl. .................................................. 360/97.02
(58) Field of Classification Search ............... 360/97.01, 360/97.02, 97.03, 98.01
See application file for complete search history.

(56) References Cited

U.S. PATENT DOCUMENTS

| 5,138,506 | A  | * | 8/1992  | Beck et al. ................. | 360/97.03 |
| 5,202,803 | A  |   | 4/1993  | Albrecht et al. | |
| 5,381,284 | A  | * | 1/1995  | Gregory et al. ............ | 360/97.02 |
| 5,627,699 | A  |   | 5/1997  | Ota et al. | |
| 5,757,581 | A  | * | 5/1998  | Yanagisawa ............... | 360/97.02 |
| 6,678,113 | B2 | * | 1/2004  | Feliss et al. ................ | 360/97.02 |
| 7,306,659 | B2 | * | 12/2007 | Gorton et al. .................. | 96/134 |
| 2003/0179490 | A1 |   | 9/2003  | Matsumoto et al. | |
| 2008/0050521 | A1 | * | 2/2008  | Ma et al. .................... | 427/248.1 |
| 2008/0310048 | A1 | * | 12/2008 | Hirono et al. .............. | 360/97.02 |
| 2011/0109989 | A1 | * | 5/2011  | Turner et al. ............... | 360/97.02 |

* cited by examiner

*Primary Examiner* — Jefferson Evans

(57) ABSTRACT

A hard-disk drive. The hard-disk drive includes a disk enclosure, a magnetic-recording disk accommodated in the disk enclosure, and a diffusion suppressing film. The diffusion suppressing film divides the space in the disk enclosure into a first space where the magnetic-recording disk is disposed and a second space for retaining a lubricant. The diffusion suppressing film also suppresses diffusion of the lubricant from the second space to the first space.

9 Claims, 8 Drawing Sheets

| | | Examples | | | Comparative Examples | | |
|---|---|---|---|---|---|---|---|
| | | 1 | 2 | 3 | 1 | 2 | 3 |
| Absorption carrier | Material | Felt-like activated carbon fiber | Zeolite | Polyester fiber + TiO2 fiber | No lubricant supplied | Dropped in stainless steel cup | Activated carbon |
| Diffusion suppressing member | Material | stretched PTFE | stretched PTFE | Polycarbonate | | Absent | Absent |
| | Average pore diameter (μm) | 0.2 | 0.5 | 0.1 | | | |
| | Breathability (cc/cm²/sec) | 0.7 | 1 | 0.4 | | | |
| Magnetic disk lubricant film thickness increment (Å) | Max (%) | 21 | 18 | 9 | 0 | 33 | 31 |
| | End (%) | 11 | 10.5 | 5 | -30 | 14 | 13 |
| | T50 (hr) | 31 | 52 | 72 | - | 11.8 | 25 |
| Weight change | | Absent | Absent | Absent | Present | Present | Present |
| Optical microscopic observation of ABS | | Absent | Absent | Absent | Present | Present | Present |
| Recording/reproducing error | | | | | | | |

FIG. 9 ized in this specification.

HARD-DISK DRIVE WITH VAPOR-PHASE LUBRICANT SUPPLY SYSTEM

CROSS-REFERENCE TO RELATED APPLICATION

This application claims priority from the Japanese Patent Application No. 2008-313592, filed Dec. 9, 2008, the disclosure of which is incorporated herein in its entirety by reference.

TECHNICAL FIELD

Embodiments of the present invention relate to a hard-disk drive (HDD), and a technique for supplying a lubricant to a magnetic-recording disk.

BACKGROUND

In a HDD, a lubricant is applied to the surface of a magnetic-recording disk for the purpose of suppressing mechanical damage due to collision with a magnetic-recording head. Such a lubricant on a magnetic-recording disk decreases with time. Thus, as is known in the art, a structure for controlling the supply of lubricant within the HDD may be used to supply fresh lubricant to a magnetic-recording disk. Engineers and scientists engaged in HDD manufacturing and development are interested in methods and systems for controlling the supply of lubricant within the HDD that meet the rising demands of the marketplace for increased data-storage capacity, performance, and reliability.

SUMMARY

Embodiments of the present invention include a hard-disk drive. The hard-disk drive includes a disk enclosure, a magnetic-recording disk accommodated in the disk enclosure, and a diffusion suppressing film. The diffusion suppressing film divides the space in the disk enclosure into a first space where the magnetic-recording disk is disposed and a second space for retaining a lubricant. The diffusion suppressing film also suppresses diffusion of the lubricant from the second space to the first space.

DESCRIPTION OF THE DRAWINGS

The accompanying drawings, which are incorporated in and form a part of this specification, illustrate embodiments of the invention and, together with the description, serve to explain the embodiments of the present invention:

FIG. 9 is table comparing evaluation results of: Example 1, Example 2, Example 3, Comparative Example 1, Comparative Example 2 and Comparative Example 3, in accordance with an embodiment of the present invention.

Figure 1:
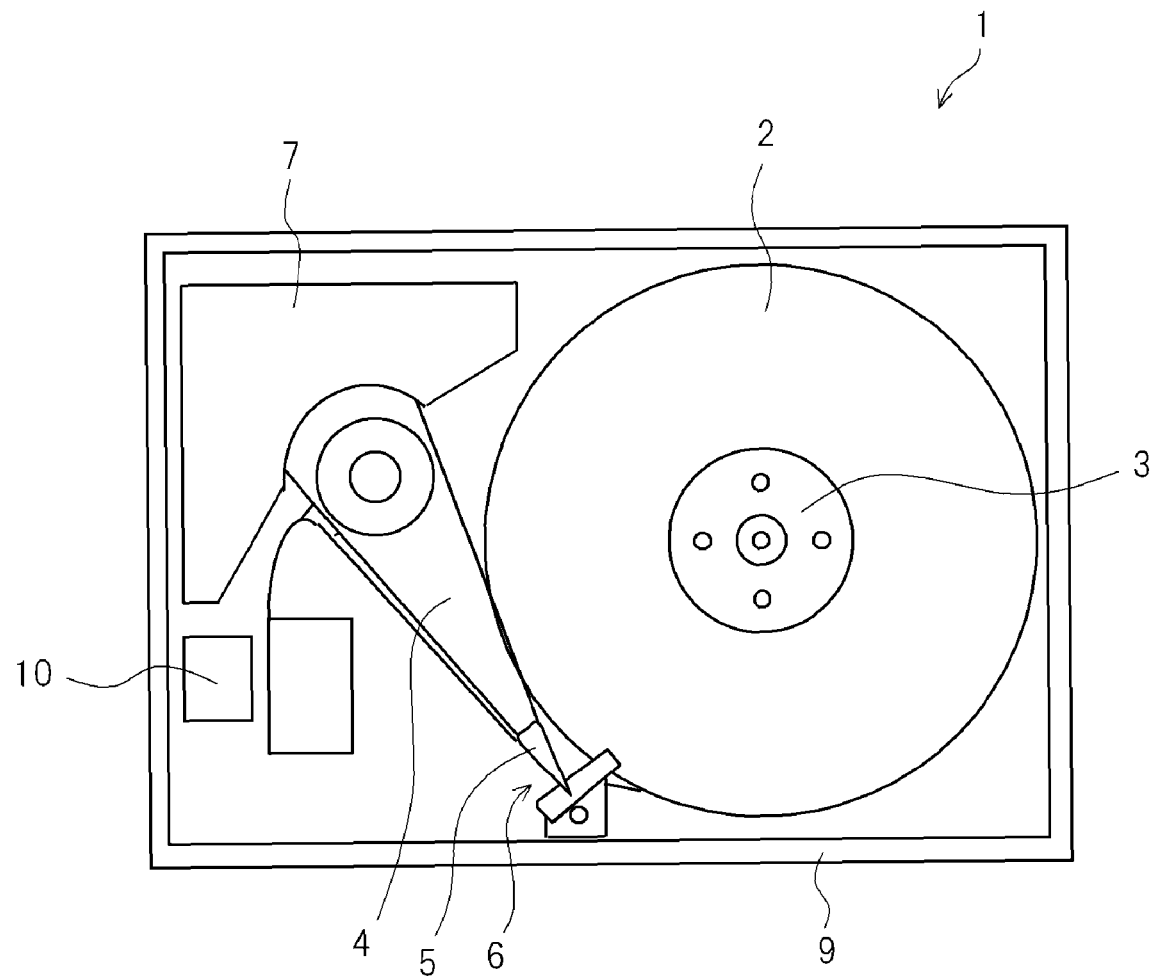
FIG. 1 is a plan view of a hard-disk drive (HDD), in accordance with an embodiment of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary. Description of Embodiments of the Present Invention for a Hard-disk Drive with Vapor-phase Lubricant Supply System With relevance to embodiments of the present invention, a technique of dropping a lubricant to a different point from the place of a magnetic-recording disk in a disk enclosure (DE) is known in the art such that a vapor-phase lubricant is supplied to the magnetic-recording disk, which is known by the term of art, "vapor-phase supply system."

Advances in hard-disk-drive (HDD) technology have resulted in the fly height of a magnetic-recording head being greatly reduced over time; and, accordingly, a lubricant is applied in a thinner layer to the magnetic-recording disk. However, as is known in the art, issues can arise in that a lubricant may be supplied to a magnetic-recording disk to a rather excessive degree such that the lubricant easily adheres to a magnetic-recording head, and other components in the HDD. Embodiments of the present invention provide a HDD capable of suppressing excessive supply of lubricant.

In accordance with embodiments of the present invention, the HDD includes a DE, a magnetic-recording disk accommodated in the DE, and a diffusion suppressing film that divides the space in the DE into a first space where the magnetic-recording disk is disposed and a second space for retaining a lubricant, and suppresses the diffusion of the lubricant from the second space to the first space.

In one embodiment of the present invention, a carrier impregnated with the lubricant is disposed in the second space.

In another embodiment of the present invention, the HDD further includes a spacer that is interposed between the diffusion suppressing film and the carrier.

In another embodiment of the present invention, the HDD further includes a diffusion suppressing member that is disposed between the carrier and the diffusion suppressing film in the second space; and, the diffusion suppressing member suppresses diffusion of the lubricant from the carrier side to a diffusion-suppressing-film side.

In another embodiment of the present invention, an assembly having at least a portion of the envelope of the assembly formed of the diffusion suppressing film and accommodating the carrier within said assembly is disposed in the DE.

In another embodiment of the present invention, the envelope of the assembly has formed within the assembly an orifice for supplying the lubricant to the carrier.

In another embodiment of the present invention, a recess is formed in the interior wall of the DE; the carrier is accommodated in the recess; and, the recess is covered with the diffusion suppressing film.

In another embodiment of the present invention, a recess that accommodates the carrier and a detour groove having one end of said detour groove connected to the recess are formed in the interior wall of the DE; of the recess and the detour groove, the other end of the detour groove is covered with the diffusion suppressing film; and, the remaining portion is covered with an impermeable member that does not allow permeation of the lubricant.

In another embodiment of the present invention, the lubricant has a higher vapor pressure than that of a lubricant used for direct application to the magnetic-recording disk.

In another embodiment of the present invention, the diffusion suppressing film is a microporous polymer film.

In another embodiment of the present invention, the carrier is a porous body.

In another embodiment of the present invention, the carrier is a collection of fibrous materials.

Thus, in accordance with embodiments of the present invention, excessive supply of lubricant may be suppressed, because of the provision of a diffusion suppressing film that separates the first space where a magnetic-recording disk is disposed and the second space for retaining a lubricant.

With reference now to FIG. 1, in accordance with embodiments of the present invention, a plan view of a HDD 1 is shown. In this figure, a top cover of the DE is not shown. A disk enclosure (DE) 9 of HDD 1 accommodates a magnetic-recording disk 2 and a head-arm assembly (HAA) 4. The magnetic-recording disk 2 is attached to a spindle motor 3 disposed on the bottom of the DE 9. The HAA 4 is rotatably supported next to the magnetic-recording disk 2. On the front end side of the HAA 4, a suspension arm 5 that supports a magnetic-recording head 6 is disposed. While on the rear end side of the HAA 4, a voice coil motor 7 is disposed. The voice coil motor 7 rotates and drives the HAA 4, moving the magnetic-recording head 6 in a substantially radial direction in proximity with a recording surface of the magnetic-recording disk 2.

In accordance with embodiments of the present invention, an assembly 10 is disposed in the DE 9 of HDD 1 as a lubricant supply mechanism that supplies a lubricant in the vapor-phase to the magnetic-recording disk 2. Each example of a lubricant supply mechanism is subsequently described herein.

First Example of Lubricant Supply Mechanism

Figure 2A:
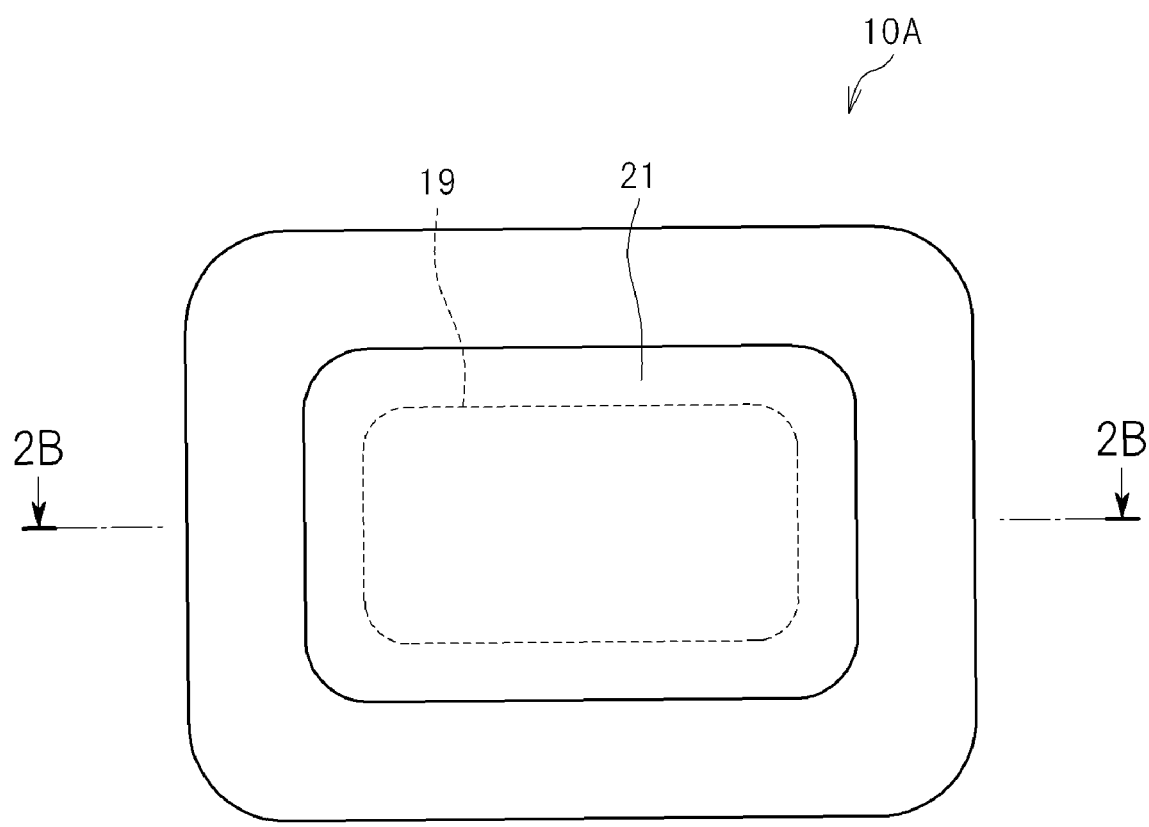
FIG. 2A is a plan view of a first example of a lubricant supply mechanism, in accordance with an embodiment of the present invention.
Figure 2B:
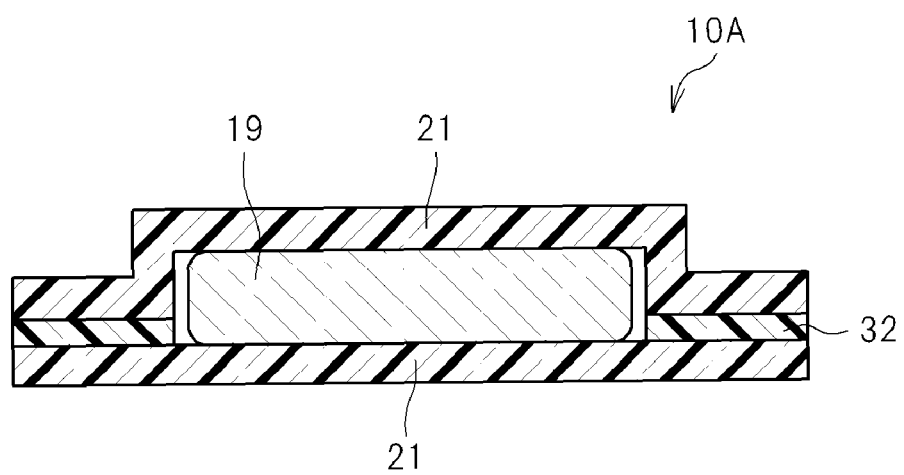
FIG. 2B is a cross-sectional view of the first example of the lubricant supply mechanism of FIG. 2A, in accordance with an embodiment of the present invention.

With reference now to FIGS. 2A and 2B, in accordance with an embodiment of the present invention, a plan view and a cross-sectional view of an assembly 10A, respectively, are shown as a first example of the lubricant supply mechanism. In the assembly 10A, two diffusion suppressing films 21 that form the envelope of the assembly 10A are adhered over the entire periphery of the assembly 10A by an adhesive agent 32, and a carrier 19 impregnated with a liquid-phase lubricant is disposed therein. The lubricant in the carrier 19 is transformed into the vapor-phase and diffuses from the inside of the assembly 10A, which is the second space, through the diffusion suppressing film 21 to the outside, which is the first space. The amount of diffusion is suppressed as compared with a case where the diffusion suppressing film 21 is absent.

The diffusion suppressing film 21 is formed of a microporous polymer film, for example. Specifically, the diffusion suppressing film 21 may be made of a material selected from the group consisting of: polytetrafluoroethylene, tetrafluoroethylene, hexafluoroethylene copolymer, polycarbonate, polyurethane, polyethylene, polypropylene, polyacrylnitrile, polyimide, and polyvinylidene fluoride. The diffusion suppressing film 21 may also be a laminate of two or more of these materials. In an embodiment of the present invention, the diffusion suppressing film 21 is made of, for example, fluororesin, or a similar highly water-repellent material. Furthermore, in another embodiment of the present invention, the diffusion suppressing film 21 includes, for example, micropores having an average pore diameter of 1 micron ($\mu$m) or less, and also has a breathability of 5 cubic centimeters per centimeter squared per second ($cc/cm^2/sec$) or less (according to a method of JIS L 1096A). When such a condition is satisfied, the diffusion suppressing film 21 allows permeation of lubricant in the vapor-phase, and permeation of lubricant in the liquid phase through the diffusion suppressing film 21 is difficult.

The carrier 19 absorbs and maintains lubricant in the liquid phase. Such a carrier 19 suppresses evaporation of a lubricant; and thus, the carrier 19 together with the diffusion suppressing film 21 suppress the amount of diffusion of the lubricant out of the assembly 10A. In an embodiment of the present invention, the carrier 19 is a collection of fibrous materials having a functional group to which a lubricant easily adheres, for example, such as: a hydroxy group, carboxyl group, ether group, ester bond group, amino group, sulfonic group, or similar lubricant adhering moiety. Furthermore, in another embodiment of the present invention, the carrier 19 is a porous body made of an inorganic compound, for example, such as: carbon, zeolite, zirconium carbide, zirconium oxide, titanium dioxide, zinc oxide, aluminum oxide, porous glass, silicon dioxide, activated carbon, calcium carbonate, sodium carbonate, or similar inorganic compound.

In an embodiment of the present invention, the lubricant with which the carrier 19 is impregnated is, for example, perfluoropolyether containing a $CH_2OH$ group. The lubricant with which the carrier 19 is impregnated is utilized: to evaporate from the carrier 19; be supplied to the magnetic-recording disk 2; and also, upon reaching the magnetic-recording disk 2, to remain on the magnetic-recording disk 2. In accordance with embodiments of the present invention, in order to achieve these effects the lubricant with which the carrier 19 is impregnated has a vapor pressure of $1\times10^{-1}$ to $1\times10^{-3}$ pascal (Pa). On the other hand, lubricant used for direct application to the magnetic-recording disk 2 remains on the magnetic-recording disk 2, but does not readily evaporate. Accordingly, in an embodiment of the present invention, the lubricant with which the carrier 19 is impregnated has a higher vapor pressure than that of the lubricant used for direct application to the magnetic-recording disk 2.

Second Example of Lubricant Supply Mechanism

Figure 3A:
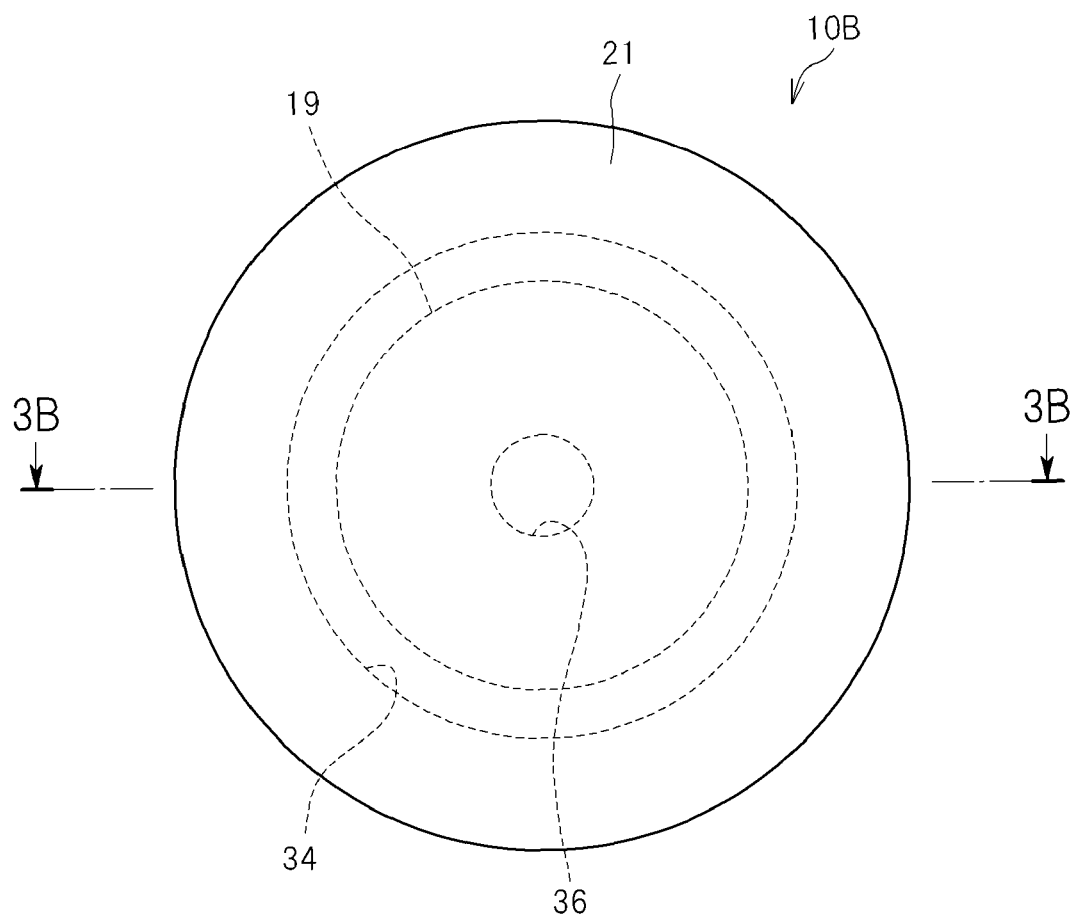
FIG. 3A is a plan view of a second example of the lubricant supply mechanism, in accordance with an embodiment of the present invention.
Figure 3B:
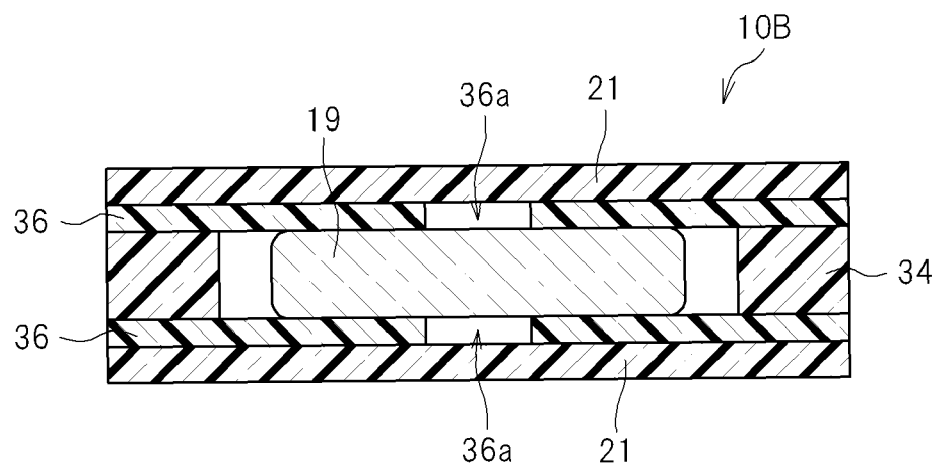
FIG. 3B is a cross-sectional view of the second example of the lubricant supply mechanism of FIG. 3A, in accordance with an embodiment of the present invention.

With reference now to FIGS. 3A and 3B, in accordance with an embodiment of the present invention, a plan view and a cross-sectional view of an assembly 10B, respectively, are shown as a second example of the lubricant supply mechanism. Structures common to the above-described example are indicated with the same reference numerals, and the detailed description is omitted from the subsequent discussion. In the assembly 10B, a disk-shaped spacer 36 having a through-hole 36a in the center is adhered to each end face of a circumferential base material 34 that encircles a carrier 19. Furthermore, a diffusion suppressing film 21 is adhered on the spacer 36.

The spacer 36 is made of, for example, polyethylene terephthalate or a similar impermeable material that does not allow permeation of lubricant. The spacer 36 is interposed in a portion between the diffusion suppressing film 21 and the carrier 19 to create a space between the diffusion suppressing film 21 and the carrier 19, which prevents contact between the diffusion suppressing film 21 and the carrier 19. The lubricant in the carrier 19 is transformed into the vapor-phase, passes through the through-hole 36a of the spacer 36, and reaches the diffusion suppressing film 21.

Because of the creation of a space between the diffusion suppressing film 21 and the carrier 19, the liquid-phase lubricant with which the carrier 19 is impregnated is prevented from oozing out of the assembly 10B due to capillarity of the diffusion suppressing film 21. Accordingly, the restriction on the size of micropores of the diffusion suppressing film 21 is alleviated; and thus, the material for the diffusion suppressing film 21 may be selected from a wider range of substances.

Furthermore, the disposition of the spacer 36 restricts the route from the carrier 19 to the diffusion suppressing film 21; and therefore, the amount of diffusion of the lubricant out of the assembly 10B may be further suppressed.

Third Example of Lubricant Supply Mechanism

Figure 4A:
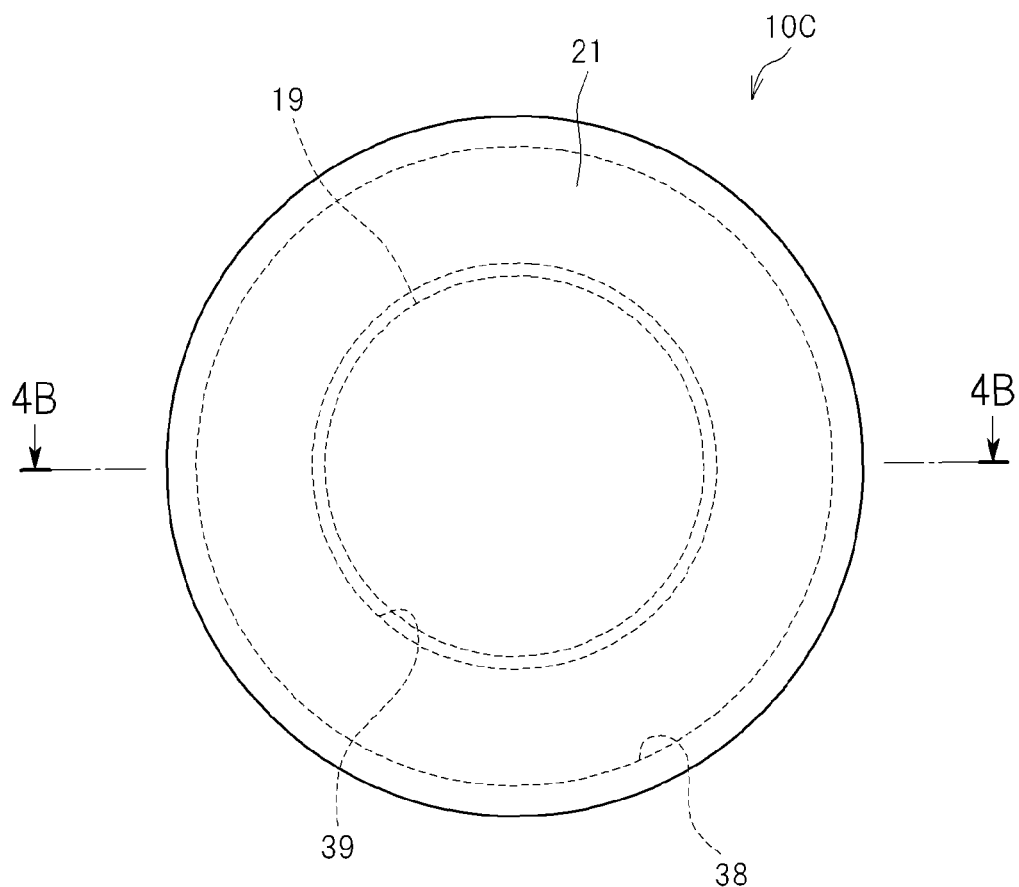
FIG. 4A is a plan view of a third example of the lubricant supply mechanism
Figure 4B:
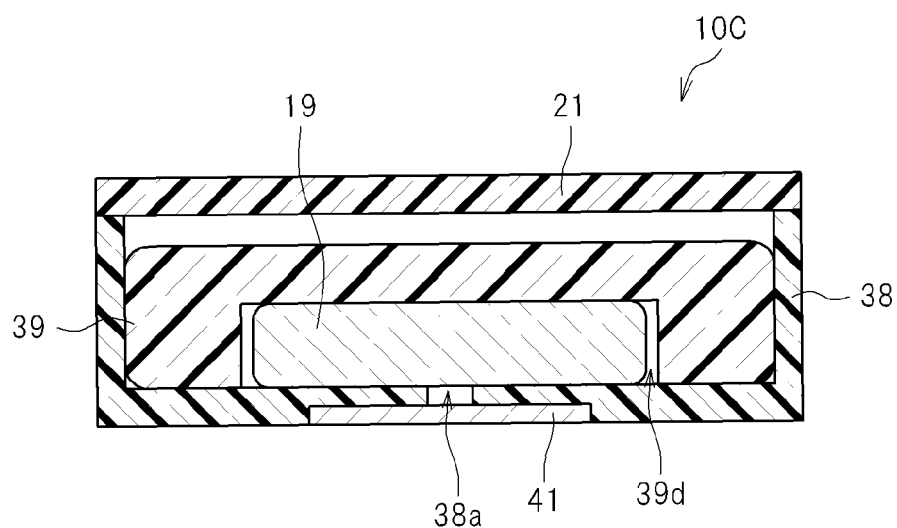
FIG. 4B is a cross-sectional view of the third example of the lubricant supply mechanism of FIG. 4A, in accordance with an embodiment of the present invention.

With reference now to FIGS. 4A and 4B, in accordance with an embodiment of the present invention, a plan view and a cross-sectional view of an assembly 10C, respectively, are shown as a third example of the lubricant supply mechanism. Structures common to the above-described examples are indicated with the same reference numerals, and the detailed description is omitted from the subsequent discussion. In the assembly 10C, the opening of a bowl-shaped member 38 made of an impermeable material forming a portion of the envelope of the assembly 10C is blocked by a diffusion suppressing film 21; and, a carrier 19 and a diffusion suppressing member 39 are accommodated within the assembly 10C.

The diffusion suppressing member 39 includes a recess 39d having a shape corresponding to the carrier 19, and covers the carrier 19 disposed on the bottom of the bowl-shaped member 38. For the diffusion suppressing member 39, the same material as that of the carrier 19, such as a porous body, may be used. The lubricant in the carrier 19 is transformed into the vapor-phase, passes through the diffusion suppressing member 39, and then reaches a diffusion suppressing film 21.

The interposition of the diffusion suppressing member 39 between the carrier 19 and the diffusion suppressing film 21 prevents diffusion of the lubricant from the carrier 19 side to the diffusion-suppressing-film 21 side; and therefore, the amount of diffusion of the lubricant out of the assembly 10C may be further suppressed.

The bowl-shaped member 38 is made of an impermeable material that does not allow permeation of lubricant, for example, such as: aluminum or a similar metal, polyethylene terephthalate, polycarbonate, PTFE, or a similar plastic. An orifice 38a for supplying a lubricant to the carrier 19 is formed in the bottom of the bowl-shaped member 38. The orifice 38a is blocked by a blocking member 41, such as a metal seal or similar seal.

Fourth Example of Lubricant Supply Mechanism

Figure 5:
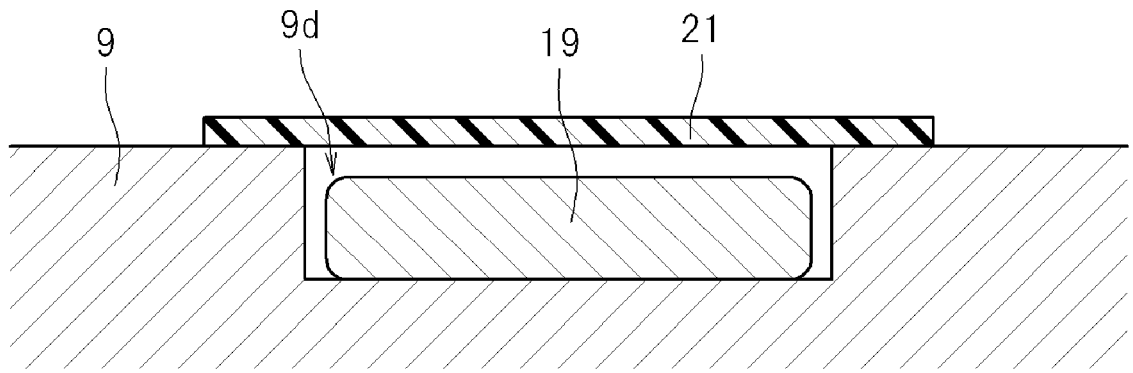
FIG. 5 is a cross-sectional view of a fourth example of the lubricant supply mechanism, in accordance with an embodiment of the present invention.

With reference now to FIG. 5, in accordance with an embodiment of the present invention, a cross-sectional view of a fourth example of the lubricant supply mechanism is shown. Structures common to the above-described examples are indicated with the same reference numerals, and the detailed description is omitted from the subsequent discussion. Unlike the above-described examples, in this example, a carrier 19 is accommodated in a recess 9d formed in the interior wall of a DE 9, and the opening of the recess 9d is blocked by a diffusion suppressing film 21. The lubricant in the carrier 19 is transformed into the vapor-phase and diffuses from the inside of the recess 9d, which is the second space, through the diffusion suppressing film 21 to the outside, which is the first space. According to this embodiment, the number of components may be reduced, while the amount of diffusion of the lubricant to the outside may be suppressed at the same time. Furthermore, in an embodiment of the present invention, as shown in FIG. 5, a space is created between the diffusion suppressing film 21 and the carrier 19.

Fifth Example of Lubricant Supply Mechanism

Figure 6A:
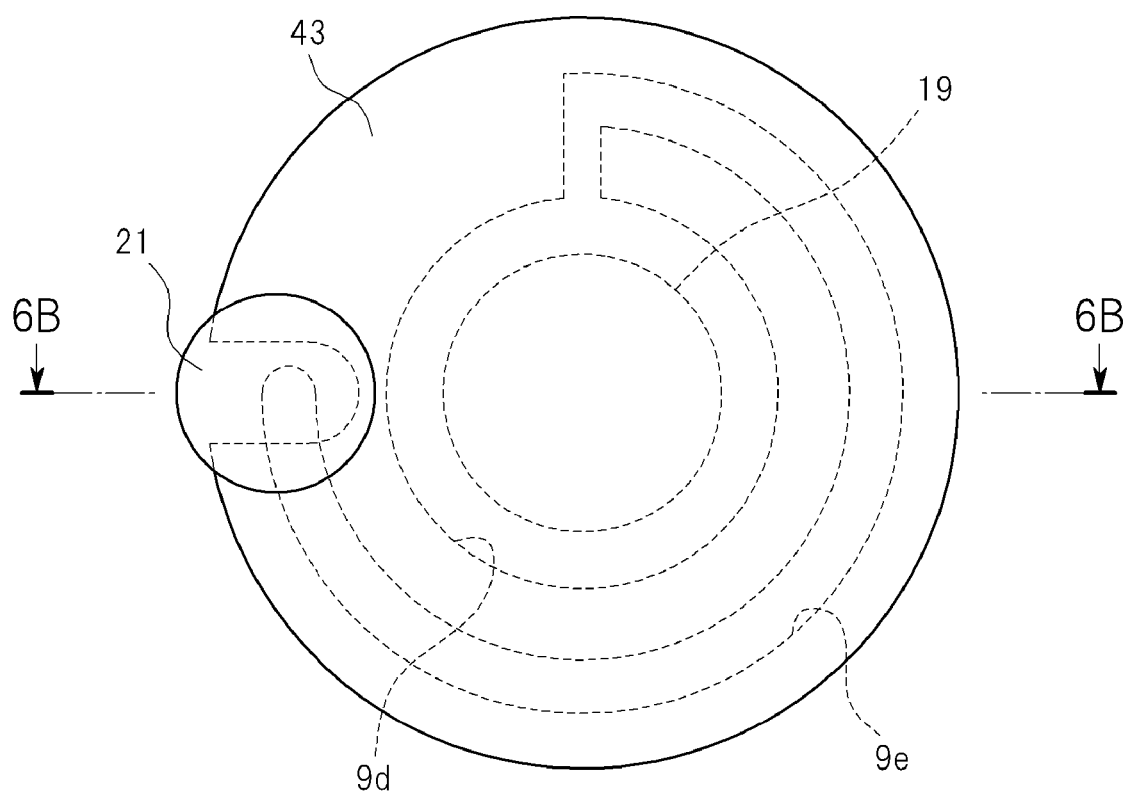
FIG. 6A is a plan view of a fifth example of the lubricant supply mechanism
Figure 6B:
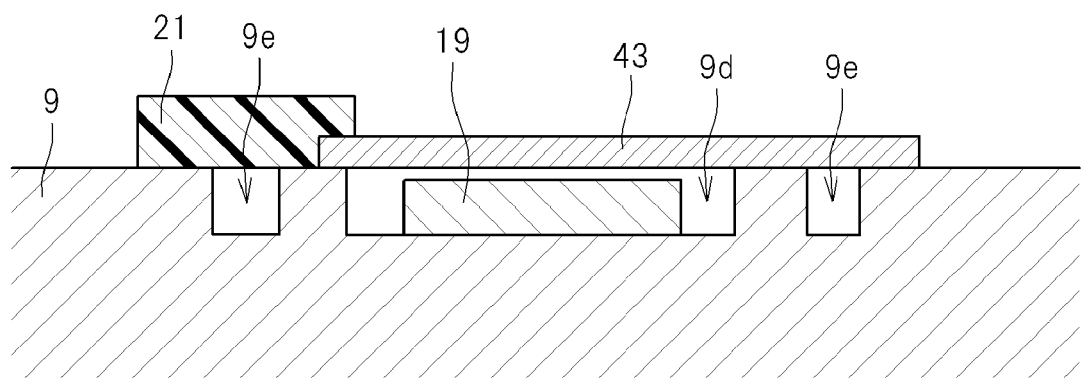
FIG. 6B is a cross-sectional view of the fifth example of the lubricant supply mechanism of FIG. 6A, in accordance with an embodiment of the present invention.

With reference now to FIGS. 6A and 6B, in accordance with an embodiment of the present invention, a plan view and a cross-sectional view, respectively, are shown of a fifth example of the lubricant supply mechanism. Structures common to the above-described examples are indicated with the same reference numerals, and the detailed description is omitted from the subsequent discussion. In this example, a recess 9d that accommodates a carrier 19 and a detour groove 9e having one end of the detour groove 9e connected to the recess 9d are formed in the interior wall of the DE 9. The detour groove 9e is formed so as to detour over more than halfway around the recess 9d. Of the recess 9d and the detour groove 9e, the other end of the detour groove 9e is covered with a diffusion suppressing film 21; and, the remaining portion a detour groove 9e is covered with an impermeable member that does not allow permeation of the lubricant, such as a metal cover or similar cover.

The lubricant in the carrier 19 is transformed into the vapor-phase, passes from one end of the detour groove 9e to the other end, and reaches the diffusion suppressing film 21. Because of the interposition of the detour groove 9e between the recess 9d and the diffusion suppressing film 21, the lubricant takes more time to reach the diffusion suppressing film 21 from the carrier 19; and, therefore, the amount of diffusion of the lubricant to the outside may be further suppressed.

The following discussion describes tests performed to confirm the effects of various examples.

Example 1

The assembly 10A of the first example shown in FIGS. 2A and 2B was constituted as follows. The size of the assembly 10 was 10 millimeters (mm)×15 mm×3 mm. As a carrier 19, felt-like activated carbon fibers having an average pore diameter of about 2 nm were used. As the diffusion suppressing film 21, stretchable polytetrafluoroethylene (stretched PTFE) having an average pore diameter of 0.2 μm and a breathability of 0.7 cc/cm²/sec was used. As an adhesive agent 32, a urethane-based adhesive agent was used. As the lubricant with which the carrier 19 is impregnated, perfluoropolyether containing a $CH_2OH$ group as a functional group and having a vapor pressure of $1×10^{-3}$ Pa was used. Meanwhile, as a lubricant used for direct application to the magnetic-recording disk 2, perfluoropolyether having a vapor pressure of $1×10^{-6}$ Pa was used.

(1) Evaluation of Breathability of Diffusion Suppressing Film

Measurements were performed in accordance with a fragile type method of JIS L 1096. Breathability is a value of the amount of air that permeates a specimen of a diffusion suppressing film under the condition of a pressure of 12.7 mm $H_2O$, as expressed in the unit (cc/cm²/sec).

(2) Evaluation of Change in Thickness of Lubricant Film on the Magnetic-Recording Disk A HDD was operated under a predetermined temperature condition, and a random seek operation was performed on a recording surface of a magnetic-recording disk having a radius of 43 mm to 19 mm. The rotational frequency was 7200 revolution per minute (rpm). The thickness of the lubricant film of a magnetic-recording disk after a lapse of a predetermined time was measured. For the measurement of lubricant film thickness, a Fourier transform infrared (FTIR) spectrometer was used. The increment for the initial thickness was expressed in percent; and, the relationship with lapsed time was evaluated. The measurement was performed up to 1000 hours. The maximum lubricant film increment is defined as a Max value; and, the lubricant film increment after a lapse of 1000 hours is defined as an End value.

(3) Evaluation of Change in Assembly Weight

The weight of an assembly disposed in a DE of the HDD in the evaluation of (2) above was measured. This enables evaluation of the amount of lubricant supplied. The initial weight of the assembly immediately after the dropping of a lubricant is measured in advance. The weight of the assembly is then measured in predetermined intervals, and the ratio relative to the initial weight is expressed in percent. The elapsed time when the initial weight is reduced by half (50%) is defined as T50. Based on the data obtained, a calculation was performed by interpolation using the least-square method.

(4) Result of Optical Microscopic Observation of Head-Slider ABS

ABS of a head-slider after a lapse of 1000 hours was observed by an optical microscope to determine whether lubricant was adhered.

(5) Read/Write Error Test

On the same conditions as in the random seek test, a magnetic-recording disk was repeatedly subjected to read/write operations to evaluate whether an error was present in the read-back signal. The presence of an error leads to the presumption that a variation occurred in the fly height of the head-slider including the magnetic-recording head.

Figure 7:
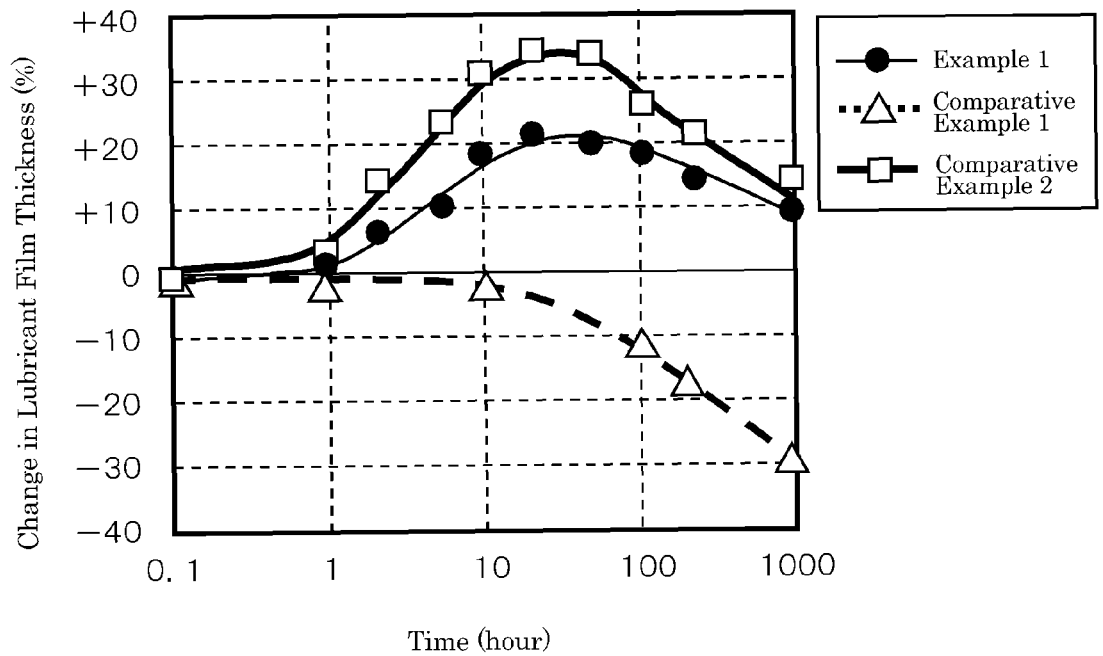
FIG. 7 is a plot of change in lubricant thickness as a function of time comparing the behavior of Example 1, Comparative Example 1 and Comparative Example 2, in accordance with an embodiment of the present invention.
Figure 8:
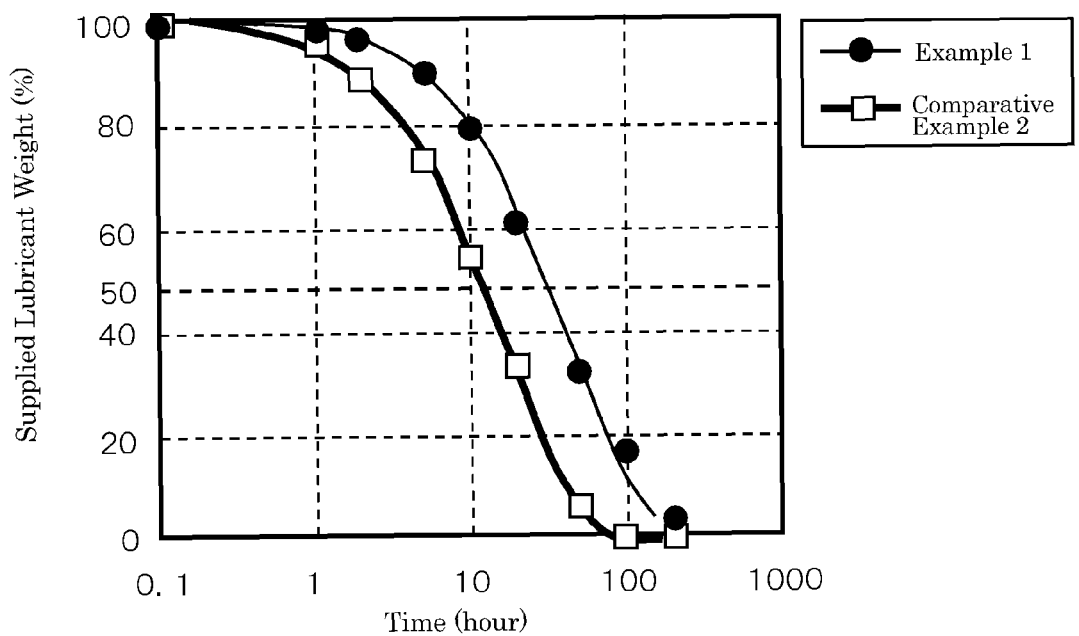
FIG. 8 is a plot of supplied lubricant weight as a function of time comparing the behavior of Example 1 with Comparative Example 2, in accordance with an embodiment of the present invention.

With reference now to FIG. 7, in accordance with an embodiment of the present invention, a plot of change in lubricant thickness as a function of time is shown that compares the behavior of Example 1, Comparative Example 1 and Comparative Example 2. As shown in FIG. 7, an example of a result of measurement of change in the thickness of a lubricant film of a magnetic-recording disk is shown. With reference also to FIG. 8, in accordance with an embodiment of the present invention, a plot of supplied lubricant weight as a function of time is shown that compares the behavior of Example 1 with Comparative Example 2. As shown in FIG. 8, an example of a result of measurement of change in the weight of an assembly is shown.

Comparative Example 1 is a case of not using a lubricant supplying means. Comparative Example 2 simulates a case of dropping a lubricant directly onto a component in a DE. Specifically, a removable cup container made of stainless steel was prepared, and the same amount lubricant as in Example 1 was dropped into the cup container and disposed in the same position in a DE. The weight of the lubricant-containing cup container is measured to determine the supplied lubricant weight change.

As shown in FIG. 7, reduction of lubricant on a magnetic-recording disk is observed in Comparative Example 1. In contrast, in Example 1 and Comparative Example 2, the lubricant film has increased with time, and a peak value exists after a lapse of several dozen hours. The Max value and the End value in Example 1 are 21% and 11%, respectively, and the Max value and the End value in Comparative Example 2 are 33% and 14%, respectively.

It is understood from FIG. 8 that the time taken for the supplied lubricant weight to be 50% (T50) is 31 hours in the Example 1 and is 11.8 hours in Comparative Example 2.

Example 2

A carrier 19 formed of an inorganic porous body made of zeolite was impregnated with a lubricant. As a diffusion suppressing film 21, a microporous polymer film made of e-PTFE having an average pore diameter of 0.5 μm and a breathability of 1 cc/cm²/sec was used.

Example 3

A carrier 19 formed of a composite nonwoven fabric of polyester fiber and TiO2 fiber was impregnated with a lubricant. As a diffusion suppressing film 21, a microporous polymer film made of polycarbonate having an average pore diameter of 0.1 μm and a breathability of 0.4 cc/cm²/sec were used.

Comparative Example 3

A carrier formed of an inorganic porous body made of activated carbon was impregnated with a lubricant, and disposed in a DE, without using a diffusion suppressing film.

With reference now to FIG. 9, in accordance with an embodiment of the present invention, a table is shown that compares evaluation results of the examples (Example 1, Example 2 and Example 3) and the comparative examples (Comparative Example 1, Comparative Example 2 and Comparative Example 3). In Comparative Example 1, the lubricant film thickness was reduced by 30% compared with the initial thickness, and as a result, a read/write error occurred. In Comparative Examples 2 and 3, a read/write error is observed. Furthermore, in Comparative Examples 2 and 3, although reduction of the lubricant film of a magnetic-recording disk due to rotational scattering is not observed, the Max value of the lubricant film thickness is relatively high; and, the T50 value as a result of weight change is small. This leads to the presumption that the lubricant is supplied to a magnetic-recording disk excessively within a short period of time after the dropping, and the rate of supply is high.

In contrast, in Examples 1 to 3, the Max value of the increase in lubricant film thickness to a magnetic-recording disk is as small as 21 Angstroms (A) or less, indicating that the lubricant was not supplied excessively. In addition, the T50 value is high, and the rate of supply is small. Furthermore, no read/write error occurred. Also, the lubricant film thickness after a lapse of 1000 hours is no lower than the initial value, which indicates that reduction of the lubricant film caused by scattering due to rotation or contact was prevented. As a result, long-term supply is possible, and the reliability will be presumably high for a long period of time.

The optical microscopic ABS observation indicates that droplets of lubricant were present in Comparative Example 2, and, in Comparative Example 3, droplets of lubricant and minute foreign substances of activated carbon, which is a supply carrier, were observed.

In contrast, in Examples 1 to 3, droplets of lubricant and foreign substances were not observed. This indicates that a diffusion suppressing film not only suppresses the amount of lubricant supply to a magnetic-recording disk, but also suppresses particulate debris generation from a porous body. An inorganic porous body is generally made of a brittle material. When such an inorganic porous body is subjected to disturbances, such as vibration, shock, atmospheric pressure change, temperature change, wind velocity, and similar mechanical disturbances, particulate debris is generated. Application of disturbances to a HDD thus has been limited. However, because the diffusion suppressing film suppresses the generation of particulate debris, the material for a carrier may be selected from a broader range of substances.

As is obvious from the above-described results, HDDs capable of preventing reduction in the lubricant film thickness caused by scattering due to rotation or contact, limiting the excessive supply, and reducing the rate of supply were those having an assembly of the type described for Examples 1 to 3.

Examples of embodiments of the present invention have been described above. However, the embodiments of the present invention are not limited to these above-described examples. For example, although a carrier 19 impregnated with a lubricant was used in the above-described first to fifth examples, embodiments of the present invention are not limited to these examples, and a lubricant may be dropped in the second space separated by the diffusion suppressing film 21.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A hard-disk drive, comprising:
   a disk enclosure;
   a magnetic-recording disk accommodated in said disk enclosure;
   a diffusion suppressing film that divides a space in said disk enclosure into a first space where said magnetic-recording disk is disposed and a second space for retaining a lubricant, and suppresses diffusion of said lubricant from said second space to said first space wherein a carrier impregnated with said lubricant is disposed in said second space; and
   a diffusion suppressing member that is disposed between said carrier and said diffusion suppressing film in said second space, and suppresses diffusion of said lubricant from said carrier side to a diffusion-suppressing-film side.

2. The hard-disk drive of claim 1, further comprising:
   a spacer that is interposed between said diffusion suppressing film and said carrier.

3. The hard-disk drive of claim 1, wherein an assembly having at least a portion of said envelope of said assembly formed of said diffusion suppressing film and accommodating said carrier within said assembly is disposed in said disk enclosure.

4. The hard-disk drive of claim 1, wherein said envelope of said assembly has formed within said envelope of said assembly an orifice for supplying said lubricant to said carrier.

5. The hard-disk drive of claim 1, wherein a recess is formed in said interior wall of said disk enclosure; said carrier is accommodated in said recess; and said recess is covered with said diffusion suppressing film.

6. The hard-disk drive of claim 1, wherein a recess that accommodates said carrier and a detour groove having one end of said detour groove connected to said recess are formed in said interior wall of said disk enclosure; an other end of said detour groove is covered with said diffusion suppressing film; and said remaining portion of said detour groove is covered with an impermeable member that does not allow permeation of said lubricant.

7. The hard-disk drive of claim 1, wherein said diffusion suppressing film is a microporous polymer film.

8. The hard-disk drive of claim 1, wherein said carrier is a porous body.

9. The hard-disk drive of claim 1, wherein said carrier is a collection of fibrous materials.

* * * * *